(12) United States Patent
Yuan et al.

(10) Patent No.: US 7,368,526 B2
(45) Date of Patent: May 6, 2008

(54) FUNCTIONALIZED POROUS POLY(ARYL ETHER KETONE) MATERIALS AND THEIR USE

(75) Inventors: Youxin Yuan, Syracuse, NY (US); Yong Ding, Wayland, MA (US)

(73) Assignee: Porogen Corporation, Medford, MA (US)

( * ) Notice: Subject to any disclaimer, the term of this patent is extended or adjusted under 35 U.S.C. 154(b) by 10 days.

(21) Appl. No.: 11/548,078

(22) Filed: Oct. 10, 2006

(65) Prior Publication Data
US 2007/0129529 A1 Jun. 7, 2007

Related U.S. Application Data

(62) Division of application No. 10/980,019, filed on Nov. 3, 2004, now Pat. No. 7,176,273.

(51) Int. Cl.
*C08F 6/06* (2006.01)
*C08F 6/12* (2006.01)
*C08G 12/00* (2006.01)

(52) U.S. Cl. .......... 528/492; 528/502 R; 528/222; 528/224; 264/514; 264/561; 264/562; 264/567; 216/500.22; 216/500.23; 216/500.27

(58) Field of Classification Search .......... 528/492, 528/502 R, 222, 224; 264/514, 561, 562, 264/567; 210/500.22, 500.23, 500.27
See application file for complete search history.

(56) References Cited

U.S. PATENT DOCUMENTS

| 4,721,732 A | 1/1988 | Dubrow et al. ............... 521/62 |
| 4,957,817 A | 9/1990 | Chau et al. .................. 428/436 |
| 4,992,485 A | 2/1991 | Koo et al. ................... 521/180 |
| 5,064,580 A | 11/1991 | Beck et al. .................... 264/28 |
| 5,089,192 A | 2/1992 | Costa .......................... 264/49 |
| 5,200,078 A | 4/1993 | Beck et al. ............ 210/500.23 |
| 5,205,968 A | 4/1993 | Damrow et al. ............... 264/28 |
| 5,227,101 A | 7/1993 | Mahoney et al. ............. 264/28 |
| 5,651,931 A | 7/1997 | Bailey et al. ................ 264/126 |
| 5,997,741 A | 12/1999 | Shimoda et al. ....... 210/500.27 |
| 6,017,455 A | 1/2000 | Shimoda et al. ....... 210/500.23 |
| 6,887,408 B2 | 5/2005 | Yuan ........................... 264/49 |
| 2002/0113006 A1 | 8/2002 | Sale et al. .................. 210/490 |

FOREIGN PATENT DOCUMENTS

EP 0 737 506 A1 10/1996

OTHER PUBLICATIONS

Mark. F. Sonnenschein, Hollow Fiber Microfiltration Membranes from Poly(ether ether ketone) (PEEK), Journal of Applied Polymer Science. vol. 72. pp. 175-181, 1999.
Rakeshh. Mehta, et al., Microporour membranes based on poly (ether ether ketone) via thermally-induced phase separation, Journal of Membrane Science 107 (1195) pp. 95-106, 1995 Elsevier Science B.V.
Matsumoto Yasuyo; others:04, Porus Polyetheretherketone Film and its Prepartion, Dec. 4, 1991, pp. 1+311-315.

*Primary Examiner*—Duc Truong
(74) *Attorney, Agent, or Firm*—St. Onge Steward Johnston & Reens LLC

(57) ABSTRACT

Functionalized porous poly(aryl ether ketone) articles are prepared by reacting ketone groups in the backbone of poly(aryl ether ketone) polymer with a primary amine reagent. Preferred functional primary amines are primary aliphatic amines or substituted hydrazines containing one or more target functional groups including polar groups, such as hydroxyl groups, ~OH, amino groups, ~$NH_2$, ~NHR, ~NRR', and ethylene oxide groups, ~$OCH_2CH_2$—, negatively or positively charged ionic groups, such as ~$SO_3^-$, ~$COO^-$, and ~$NH_4^+$ groups, hydrophobic groups such as siloxane or perfluorcarbone groups, and non-polar groups, such as linear or branched hydrocarbon groups. The functionalized porous poly(aryl ether ketone) article can be prepared by reacting primary amine with a pre-formed, shaped porous poly(aryl ether ketone) article or by functionalizing the surface of a non-porous precursor article that is subsequently converted into a porous article.

38 Claims, No Drawings

FUNCTIONALIZED POROUS POLY(ARYL ETHER KETONE) MATERIALS AND THEIR USE

CROSS-REFERENCE TO RELATED APPLICATIONS

This application is a divisional of U.S. patent application Ser. No. 10/980,019, filed on Nov. 3, 2004, now U.S. Pat. No. 7,176,273.

FIELD OF THE INVENTION

This invention relates to preparation of functionalized porous poly(aryl ether ketone) materials, including poly(aryl ether ether ketone) and poly(aryl ether ketone ketone) polymeric materials, collectively referred to as poly(aryl ether ketone), PAEK, materials and the use thereof.

BACKGROUND OF THE INVENTION

The method of the instant invention provides for preparation of porous PAEK materials modified with target functional groups including polar groups, such as hydroxyl groups, —OH, or primary, secondary or tertiary amino groups, —$NH_2$, =NH, ≡NR, negatively or positively charged ionic groups, such as —$SO_3^-$, —$COO^-$, and —$NH_4^+$ groups, hydrophobic groups such as siloxane or perfluorcarbone groups, and non-polar groups, such as linear or branched hydrocarbon groups. Porous PAEK articles can be modified with target functional groups throughout the porous body of the article or the modification can be limited to the surface of the porous article only. In one embodiment of this invention the porous PAEK article is formed first followed by the surface functionalization. In another embodiment of this invention, a porous PAEK article is formed by functionalizing the surface of a non-porous PAEK article first followed by the formation of the internal porous structure. The functionalized porous PAEK article can be in the form of a flat sheet, a rod, a sphere, or a tube. Functionalized PAEK materials of complex shapes can be further prepared following the teaching of the present invention, including a hollow fiber configuration. Functionalized porous PAEK articles of this invention can be used as a porous media for a broad range of applications, including porous membranes for fluid separations, such as microfiltration, nanofiltration, ultrafiltration and gas separation, as membrane bioreactors and membrane contactors, as battery separators and as a sorption media.

Porous polymeric membranes are well known in the art and are used widely for filtration and purification processes, such as filtration of waste water, preparation of ultra pure water and in medical, pharmaceutical or food applications, including removal of microorganisms, dialyses and protein filtration. Porous polymeric membranes are also used as contactors to facilitate dissolution of gases in liquids or to remove gases from liquids, as membrane bioreactors, and in numerous other applications where they serve as a generic phase separator, for example, as a battery separator. While these membranes have found broad utility for a variety of purposes, they suffer from several disadvantages: broad and non uniform pore size distribution, limited chemical, solvent and thermal resistance, and surface characteristics that do not meet target application requirements. For example, porous ultrafiltration membranes are frequently subject to fouling due to the dissolved solute adsorption on the membrane surface. Thus membranes with hydrophilic anti-fouling surface characteristics are still required. Porous polyolefin membranes, such as polypropylene and polyethylene membranes, are utilized as membrane contactors to promote dissolution or removal of gases from liquids. However, these membranes frequently wet out by the liquid media which leads to reduction in mass transfer and an inferior performance. Porous membranes with improved surface properties are thus required for continuous stable operation of membrane contactors. Furthermore, commercial porous membranes exhibit limited solvent resistance that limits the scope of their application. Porous membranes with tailored surface characteristics, uniform pore size distribution, improved thermal stability and solvent resistance are thus still needed.

Poly(aryl ether ketone)s represent a class of semi-crystalline engineering thermoplastics with outstanding thermal properties and chemical resistance. One of the representative polymers in this class is poly(ether ether ketone), PEEK, which has a reported continuous service temperature of approximately 250° C. PAEK polymers are virtually insoluble in all common solvents at room temperature. These properties make PAEK attractive materials for porous membrane preparation. However, application of PAEK polymers to fabrication of membranes has been limited owing to their intractability, which prevents the use of conventional solvent-based methods of membrane casting.

PAEK polymers can be chemically modified to impart functionality, for example, by sulfonation. However, articles formed from such functionalized PAEK polymers lose many of the desired properties. Bulk modification leads to a disruption in polymer chain crystallization and articles subsequently formed from such functionalized polymers loose solvent resistant properties. Chemical resistance of PEAK polymers makes the functional modification of the preformed porous article difficult and such functionalized porous PAEK articles are virtually unknown.

A number of methods to prepare porous PAEK membranes have been disclosed in the art. It is known to prepare porous PEEK membranes from solutions of strong acids, such as concentrated sulfuric acid. However, PEEK can undergo sulfonation in the concentrated sulfuric acid media and thus can loose some of its desirable sought after properties. U.S. Pat. No. 6,017,455 discloses preparation of non-sulfonated porous PEEK membranes from concentrated sulfuric acid solvents sufficiently diluted by water to prevent sulfonation. The membranes are formed by casting PEEK solution to form a film followed by coagulation in a concentrated sulfuric acid. This membrane preparation process is complicated and produces large amounts of waste acid.

U.S. Pat. No. 5,997,741 discloses preparation of porous PEEK membranes by forming a solution of PEEK polymer in a concentrated sulfuric acid at the temperature of 15° C. or lower to prevent sulfonation. The solution is processed and cast at a sub ambient temperature, followed by coagulation in water or in a concentrated sulfuric acid. Only dilute PEEK solutions can be formed in the concentrated sulfuric acid which adversely affects film forming characteristics, the mechanical characteristics, and the pore morphology of the porous PEEK membranes.

U.S. Pat. Nos. 4,992,485 and 5,089,192 disclose preparation of PEEK membranes from non-sulfonating acid solvents that include methane sulfonic acid and trifluoromethane sulfonic acid. European Patent Specification EP 0 737 506 discloses preparation of improved polymeric membranes based on PEEK admixtures with polyethylene terephthalate. The membranes are formed by the solution casting process from a methane sulfuric acid/sulfuric acid solvent mixture.

The acid based solvent systems for manufacturing of porous PEEK membranes disclosed in the art are highly corrosive, frequently toxic and generate substantial environmental and disposal problems. For these and other reasons, the acid based casting processes have found limited commercial use.

An alternative to the acid based solvent system for PEEK membrane preparation involves the use of high boiling point solvents and plasticizers that dissolve PEEK polymer at elevated temperatures. U.S. Pat. Nos. 4,957,817 and 5,064,580, both issued to Dow Chemical Co., disclose preparation of porous PEEK articles from its admixture with organic polar solvents having a boiling point in the range of 191° C. to 380° C., such as benzophenone and 1-chloronaphthalene, and organic plasticizers capable of dissolving at least 10 weight percent of PEEK, respectively. The final porous article is formed by removing the organic polar solvents and/or plasticizers by dissolution into a low boiling temperature solvent.

U.S. Pat. No. 5,200,078 discloses preparation of microporous PEEK membranes from its mixtures with plasticizers wherein the membrane undergoes a drawing step prior to or after the plasticizer is removed by leaching.

U.S. Pat. No. 5,227,101 issued to Dow Chemical Co. discloses preparation of microporous membranes from poly (aryl ether ketone) type polymer by forming a mixture of PEEK type polymer, a low melting point crystallizable polymer, and a plasticizer, heating the resulting mixture, extruding or casting the mixture into a membrane, quenching or coagulating the membrane and leaching the pore forming components.

U.S. Pat. No. 5,205,968, issued to Dow Chemical Co., discloses preparation of microporous membranes from a blend containing a poly(aryl ether ketone) type polymer, an amorphous polymer and a solvent.

M. F. Sonnenschein, in the article entitled "Hollow fiber microfiltration membranes from poly(ether ether ketone)", published in the Journal of Applied Polymer Science, Volume 72, pages 175-181, 1999, describes preparation of PEEK hollow fiber membranes by thermal phase inversion process. The use of a leachable additive polymer, such as polysulfone, is proposed to enhance membrane performance. Preparation of porous PEEK membranes by coextrusion of PEEK with polysulfone polymers followed by the dissolution of the polysulfone polymer from the interpenetrating network is disclosed in European Patent Application 409416 A2.

It is also known in the art to prepare porous PEEK membranes from its blends with a compatible poly(ether imide) polymer, PEI. Preparation of such membranes is described by R. S. Dubrow and M. F. Froix in U.S. Pat. No. 4,721,732 and by R. H. Mehta et al. in an article entitled "Microporous membranes based on poly(ether ether ketone) via thermally induced phase separation", published in the Journal of Membrane Science, Volume 107, pages 93-106, 1995. The porous structure of these PEEK membranes is formed by leaching the poly(ether imide) component with an appropriate strong solvent such as dimethylformamide. However, as described by Mehta et al., the quantitative removal of PEI component by leaching is essentially impossible which in turn can lead to an inferior membrane performance.

Japan Kokai Tokkyo Koho 91273038 assigned to Sumitomo Electric Industries, Ltd., discloses preparation of porous PEEK membranes by an ion track etching method.

M. L. Bailey et al. in U.S. Pat. No. 5,651,931 describe a sintering process for the preparation of biocompatible filters, including PEEK filters. The filters are formed from a PEEK powder of a pre-selected average particle size by first pressing the powder into a "cake" followed by sintering in an oven or furnace. The process is limited to preparation of filters with a relatively large pore size and a broad pore size distribution and does not provide economic means of forming large membrane area fluid separation devices.

A number of techniques have been used in the art to chemically modify the surface of dense PEEK films to affect surface characteristics such as friction, wettability, adsorption and adhesion, including cell adhesion. O. Noiset, et al., have modified the PEEK film surface using wet-chemistry technique by selectively reducing ketone groups to form hydroxyl groups and then covalently fixing hexamethylene diisocyanate by addition onto the hydroxyl function (Journal of Polymer Science, Part A, Vol. 35, pages 3779-3790, 1997). C. Henneuse-Boxus, et al., have modified PEEK film surfaces using photochemical routes (European polymer Journal, Vol. 37, pages 9-18, 2001). P. Laurens, et al., have modified PEEK surfaces with excimer laser radiation (Applied Surface Science, Vol. 138-139, pages 93-96, 1999). N. Frauchina and T. McCarthy have modified semi-crystalline PEEK films with carbonyl-selective reagents to induce surface functionality (Macromolecules, Vol. 24, pages 3045-3049, 1991). The surface modified films were robust and unaffected by a variety of solvents.

In U.S. Pat. No. 5,260,415, I. David disclosed a process for the crosslinking of polymer containing diaryl ketone groups by heating the polymer with alcohol and/or alkoxide to enhance chemical resistance.

However, there is no disclosure in the prior art of a simple and commercially scalable process for the preparation of functionalized porous PAEK articles including porous PAEK membranes and use thereof.

SUMMARY OF THE INVENTION

It is thus an objective of this invention to provide a simple, cost effective, and industrially feasible process for the preparation of functionalized porous PAEK articles.

It is another object of the present invention to form functionalized porous PAEK materials with high concentration of target surface groups.

It is another object of the present invention to prepare porous PAEK materials modified with functional surface groups that are utilized as fluid separation membranes, inclusive of but not limited to microfiltration, nanofiltration, ultrafiltration and gas separation membranes, as membrane bioreactors, as membrane contactors, as battery separators and as a sorption media, inclusive of but not limited to chromatographic media.

It is another object of this invention to provide surface functionalized porous PAEK articles with improved porous structure that are solvent resistant and can operate at high temperatures.

A further objective of this invention is to provide an improved fluid separation process that utilizes functionalized PAEK membranes.

In one embodiment of this invention these and other objectives of this invention that are apparent to those skilled in the art have been met by the process of preparing a functionalized porous PAEK article by reacting ketone groups in poly(aryl ether ketone) polymer with an aminofunctional reagent containing one or more target functional groups including polar groups, such as hydroxyl groups, ~OH, amino groups, ~$NH_2$, ~NHR, ~NRR', and ethylene oxide groups, ~$OCH_2CH_2$—, negatively or positively charged ionic groups, such as $\sim SO_3^-$, $\sim COO^-$, and $\sim NH_4^+$ groups, hydrophobic groups such as siloxane or perfluorcarbone groups, and non-polar groups, such as linear or branched hydrocarbon groups. The porous PEAK article can be subjected to modification by the amino-functional reagent throughout the porous structure or selectively at the surface of the porous article only. The functionalization can be carried on a pre-formed shaped porous PAEK article, on a non-porous precursor article that is then the subject to pore formation or the functionalization and pore formation can be carried out simultaneously in a single step process.

According to one embodiment of the present invention the above objectives and other objectives that are apparent to those skilled in the art are achieved by a process for the preparation of a functionalized porous poly(aryl ether ketone) article comprising:

a. forming a blend of poly(aryl ether ketone) polymer with a polyimide,
b. forming a shaped article from said blend by extrusion, casting or molding,
c. annealing said shaped article,
d. functionalizing the surface of said shaped article
e. bringing said shaped article into contact with a primary amine to affect decomposition of the polyimide phase in said shaped article into low molecular weight fragments,
f. removing said low molecular weight fragments from said article, and
g. drying said surface functionalized porous poly(aryl ether ketone) article.

According to another embodiment of the present invention the above objectives and other objectives that are apparent to those skilled in the art are achieved by a process for the preparation of a functionalized porous poly(aryl ether ketone) article comprising:

a. forming a blend of poly(aryl ether ketone) polymer with a polymeric porogen,
b. forming a shaped article from said blend by extrusion, casting or molding,
c. annealing said shaped article,
d. bringing said shaped article into contact with a liquid media that contains a primary amine to affect removal of said polymeric porogen from shaped article while simultaneously affecting functionalization of the poly (aryl ether ketone) phase with said primary amine.

The preferred porogens of this invention are aromatic polyimides and their mixtures with other polymers and preferred primary amines are aliphatic primary amines.

According to another embodiment of the present invention, the above objectives and other objectives that are apparent to those skilled in the art are achieved by a process of the preparation of a porous poly(aryl ether ketone) article comprising:

a. forming a blend of poly(aryl ether ketone) type polymer with a polyimide;
b. forming a shaped article from the blend by extrusion, casting or molding;
c. annealing the shaped article;
d. bringing the shaped article into contact with a primary amine to affect decomposition of the polyimide phase in the shaped article into low molecular weight fragments under conditions that do not affect functionalization of the poly(aryl ether ketone) polymer with the primary amine; and
e. removing the low molecular weight fragments from the article.

The porous PAEK article formed by the above described process can be then functionalized in a subsequent step by reacting the porous article with a primary amine containing one or more target functional groups including polar groups, such as hydroxyl groups, $\sim OH$, amino groups, $\sim NH_2$, $\sim NHR$, $\sim NRR'$, and ethylene oxide groups, $\sim OCH_2CH_2\!-\!$, negatively or positively charged ionic groups, such as $\sim SO_3^-$, $\sim COO^-$, and $\sim NH_4^+$ groups, hydrophobic groups such as siloxane or perfluorcarbone groups, and non-polar groups, such as linear or branched hydrocarbon groups. The porous PAEK article can be subjected to modification by the primary amine reagent throughout the porous structure or selectively at the surface of the porous article only. Composite PAEK membranes can be prepared utilizing amino-functional polymers and oligomers by functionalizing exterior surface of porous PAEK membranes only.

According to further embodiment of the present invention, the above objectives and other objectives that are apparent to those skilled in the art are achieved by a method of separating a fluid mixture into a fraction enriched in a first component and a fraction depleted in the first component by contacting the fluid mixture with a functionalized porous poly(aryl ether ketone) fluid separation membrane whereby a fraction enriched in the first component and a fraction depleted in the first component are generated by preferentially permeating a portion of the fluid mixture through the functionalized poly(aryl ether ketone) fluid separation membrane.

DETAILED DESCRIPTION OF EXEMPLARY EMBODIMENTS OF THE INVENTION

The functionalized porous PAEK articles of this invention are prepared by reacting ketone groups in the backbone of poly(aryl ether ketone) polymer with a functional primary amine. Preferred functional primary amines are primary aliphatic amines or substituted hydrazines. The porous PEAK article can be functionalized by the amino-functional reagent throughout the porous structure or selectively at the surface of the porous article only. The functionalization can be carried by reacting primary amine with a pre-formed, shaped porous PAEK article or by functionalizing the surface of a non-porous precursor article that is subsequently converted into a porous article. It is also within the scope of this invention to prepare functionalized porous PAEK articles wherein the functionalization and the pore formation take place simultaneously in a single step process. The preferred functionalized porous PAEK articles of this invention are semi-crystalline. Namely, a fraction of the poly(aryl ether ketone) polymer phase is crystalline and is not subject to modification. A high degree of crystallinity is preferred since it imparts solvent resistance and improved thermo-mechanical characteristics to the article. In some embodiments of this invention the degree of crystallinity is at least 10%, preferably at least 20%, most preferably at least 25%. When pre-formed, shaped porous articles are utilized to form the functionalized articles of this invention, the porous article can be formed by any method known in the art.

The porous article of this invention is comprised of a poly(aryl ether ketone) or a blend of poly(aryl ether ketone)s of the following general formula:

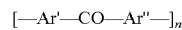

wherein Ar' and Ar" are aromatic moieties, wherein at least one aromatic moiety contains a diarylether or diarylthioether functional group which is a part of the polymer backbone, and wherein n is integer from 20 to 500.

Preferably, the poly(aryl ether ketone) is selected from the homopolymers of the following repeat units:

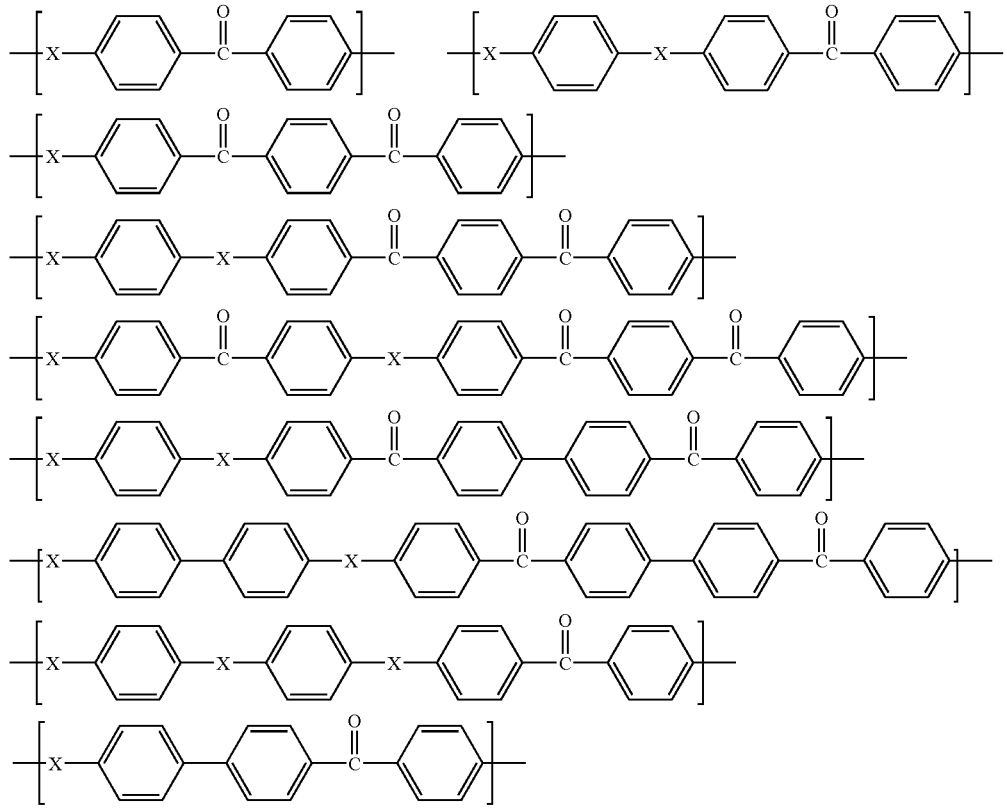

where X = O, S.

The poly(aryl ether ketone)s typically have a weight average molecular weight in the range of 20,000 to 1,000,000 Daltons, preferably between 30,000 to 500,000 Daltons.

The preferred poly(aryl ether ketone)s of this invention are semi-crystalline, and are insoluble in organic solvents at room temperature. The most preferred poly(aryl ether ketone) of this invention is poly(ether ether ketone), PEEK, and poly(ether ketone), PEK, both manufacture by Victrex Corporation under the trade name of Victrex®.

The preferred method of forming porous PAEK articles is by melt processing. The preparation of porous poly(aryl ether ketone) article typically consists of the following steps:
1. Forming a blend of poly(aryl ether ketone) polymer with a porogen by melt blending. The porogen is alternatively a diluent (a high boiling, low molecular weight liquid or solid), an intermediate molecular weight oligomer or a polymer;
2. Forming a shaped article from the blend by melt processing, i.e. extrusion, casting or molding;
3. Solidifying the shaped article by cooling;
4. Removing the porogen (the porogen is typically removed by extraction);
5. Evaporating the extractent to yield the porous PAEK article.

Prior to porogen removal, subsequent to porogen removal or both the article can be annealed to increase the degree of crystallinity of the PAEK phase. The term annealing as defined herein refers to a processing step or condition that leads to an increase in the degree of crystallinity of the PAEK phase. The annealing can take place during solidification step through control of the cooling rate. For example, the annealing can be carried out in line during the extrusion step by controlling the cooling rate. Alternatively or in an addition the annealing can be carried our in a subsequent step after the article has been formed by solidification. In the later case the solidified article can be placed in an oven or transported through a heating zone for a period of time sufficient to affect crystallization. The article can be annealed at a temperature from about 150° C. to about 330° C., preferably from about 200° C. to about 300° C., most preferably from 230° C. to about 280° C. to increase the crystallinity of PAEK phase prior to the removal of the porogen.

The use of polymeric materials as porogens is generally preferred. Examples of polymeric porogens include polysulfones, such as poly(ether sulfone), poly(ether ether sulfone), biphenol based polysulfones and bisphenol A based polysulfone, and polyimides. The most preferred polymeric porogens are polyimides. Poly(aryl ether ketone) type polymers form compatible blends with polyimides, PI. Removal of the polyimide component from such blend article by solvent extraction is, however, very difficult due to polymer chain entanglement. We have discovered a novel method of forming porous PAEK articles from PAEK/PI blends. The porous article is formed in a two step process. First a precursor article is formed from the poly(aryl ether ketone)/polyimide blend by extrusion, casting or molding followed by a selective chemical decomposition of the polyimide phase to form the final porous article. We have named this method of porous PAEK material preparation a Reactive Porogen Removal, RPR, process.

Polyimides that form the compatible precursor blend with the poly(aryl ether ketone) polymers are defined as polymers containing

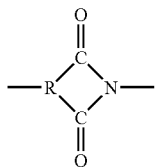

linkages and include aliphatic and aromatic polyimides, copolyimides and polyimide block and graft copolymers, wherein the polyimide is defined as a molecule that contains at least two imide linkages. Additional polyimides include aromatic polyamide imides, polyhydrazine imides and polyester imides.

Aromatic polyimides are particularly useful for the preparation of porous articles of this invention. The preferred aromatic polyimides are described by the following general formula:

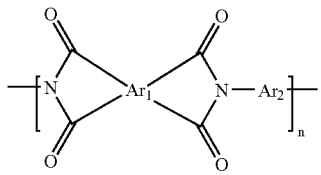

where n is an integer from 2 to 5,000, and where

is independently

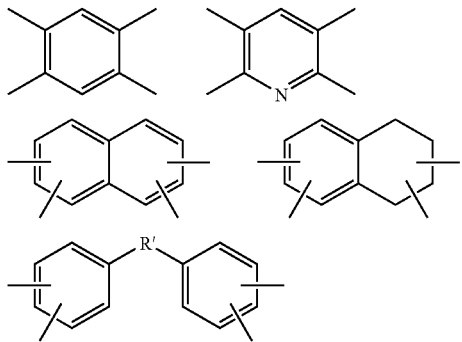

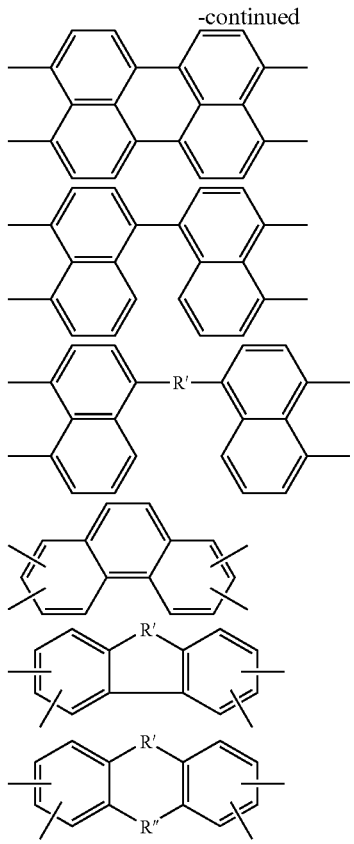

or mixtures thereof.

—R'— is

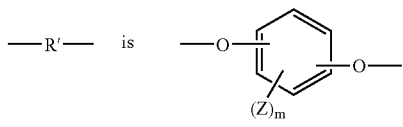

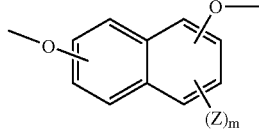

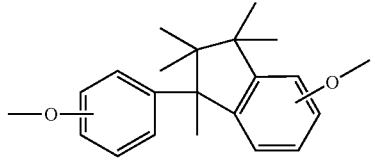

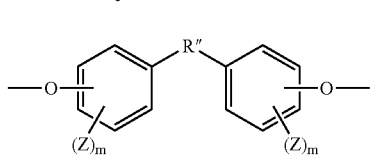

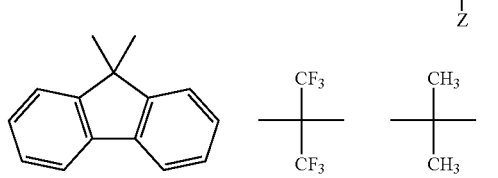

-continued
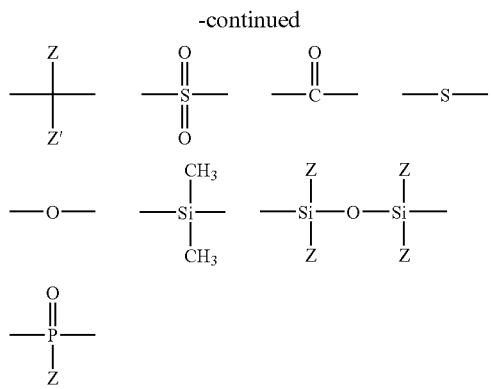
where m equals 0 to 4.
—R″— is
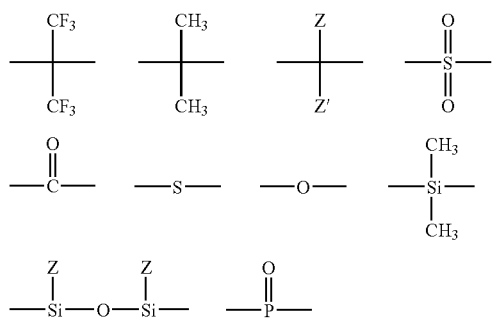
Z and Z′ are: —H, —CH$_3$, —CH$_2$CH$_3$, —CH$_2$CH$_2$CH$_3$, iso-propyl, iso-butyl, tert-butyl, —Br, —Cl, —F, —NO$_2$, —CN
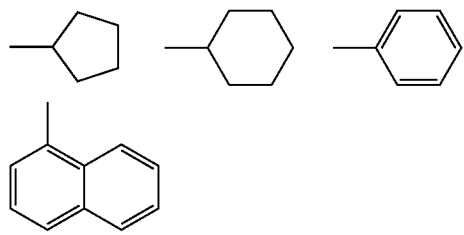
where —Ar$_2$— is independently
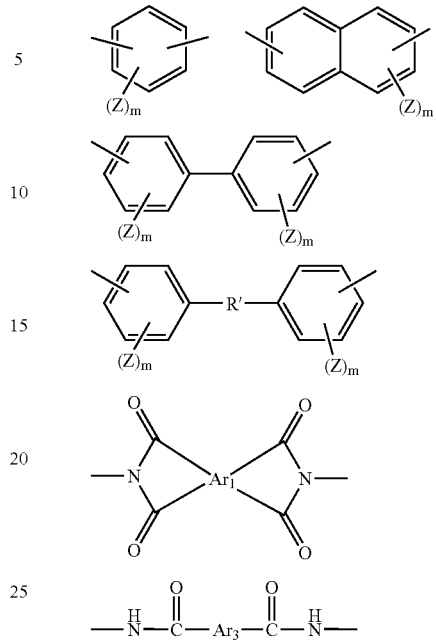
or mixtures thereof, where Ar$_1$ and m are defined as above.
—Ar$_3$— is
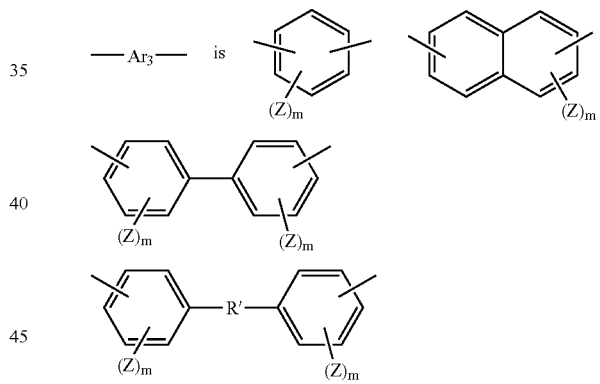
where m is defined above.
The most preferred polyimides are poly(ether imide)s, PEI, of the following formula:
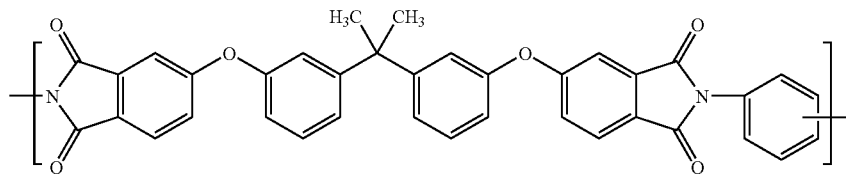

and poly(ether imide) copolymers manufactured by the General Electric Company under the trade name of Ultem® 1000, Ultem® XH1010F, Ultem® 6050 and Siltem® STM1500. The copolymers that contain dimethylsiloxane or sulfone units are examples of representative copolymers.

The polyimides can be used as a single additive component or as a mixture of polyimides. The polyimides typically have a weight average molecular weight in the range of 500 to 1,000,000 Daltons, preferably between 1,000 to 500,000 Daltons.

The formation of the poly(aryl ether ketone) blend with the polyimide can be carried out by mixing components in a molten stage, such as by melt compounding, and other methods conventionally employed in the polymer compounding industry. A plasticizer can be optionally added to aid processing. The thus formed poly(aryl ether ketone)/polyimide blends form compatible blend compositions. The compatible composition is defined as capable of forming porous poly(aryl ether ketone) articles with inter-connected pore structure and an average pore diameter of 10 micrometer or less. Preferred compatible blends are PEEK/PEI blends that form poly(aryl ether ketone) articles with inter-connected pore structure and an average pore diameter of 1 micrometer or less. The most preferred compatible blends are the PEEK/PEI blends that form poly(aryl ether ketone) articles with inter-connected pore structure and an average pore diameter of 100 nanometer or less. The application requirements determine the desired pore size that in turn is determined by the polyimide structure and by the processing conditions.

Blends suitable for preparation of porous articles in accordance with this invention comprise from about 5 to about 95 weight percent of the poly(aryl ether ketone) polymer component, preferably from about 20 to about 75 weight percent of the poly(aryl ether ketone) component, most preferably from 40 to 60 weight percent.

The blends can contain various additives in addition to the compatible polyimide component, including solvents to reduce blend viscosity, stabilizers, flame retardants, pigments, fillers, such as catalytic particles, plasticizers, and the like. Other polymers can be also present in the blend to provide a desired additive property and in particular to modify pore size. One such preferred additive polymer is poly(ether sulfone).

The poly(aryl ether ketone)/polyimide blends can be fabricated into a flat sheet film, a fiber, a hollow fiber or other desired shape precursor article by melt extrusion, casting or molding. The article configuration will depend on the intended use. Prior to polyimide phase removal the article is preferably annealed to increase the degree of crystallinity of the PAEK phase. As discussed above, the annealing can take place during solidification step through control of the cooling rate. For example, the annealing can be carried out in line during the extrusion step by controlling the cooling rate. Alternatively or in an addition the annealing can be carried our in a subsequent step after the article has been solidified and collected. In the later case the solidified article can be placed in an oven or transported through a heating zone for a period of time sufficient to affect crystallization. The article can be annealed at a temperature from about 150° C. to about 330° C., preferably from about 200° C. to about 300° C., most preferably from 230° C. to about 280° C. to increase the crystallinity of PAEK phase prior to the removal of the polyimide porogen.

The removal of the polyimide component of the blend can be effectively carried out by the RPR process utilizing reagents that decompose the polyimide into low molecular weight easily extractable fragments. The suitable classes of reagents include but are not limited to ammonia, tetraalkylammonium hydroxides, hydrazine, alkylhydrazines, hydroxyalkylhydrazine, primary aliphatic amines, or secondary aliphatic amines. In some embodiments, the reagent that affects polyimide decomposition is diluted with a solvent. Examples of suitable solvents include alcohols, ketones, hydrocarbons, water, and aprotic solvents such as NMP, DMF, and the like. Reagents suitable to decompose the polyimide phase in accordance with this invention include, but are not limited to, ammonia, tetramethylammonium hydroxide, hydrazine, methylamine, ethylamine, propylamine, butylamine, ethylenediamine, propylenediamine, butylenediamine, morpholine, piperazine, monoethanolamine, ethylethanolamine, diethanolamine, propanolamine, dipropanolamine, and mixtures thereof. Commercially available amine mixtures, such as Ucarsol®, can be also employed. The preferred amines include hydrazine, monoethanolamine, tetramethylammonium hydroxide, and their mixtures with alcohols, such as methanol, ethanol, isopropanol, or butanol, ketones, water, and aprotic solvents. The most preferred reagents for the decomposition of the polyimide phase are the monoethanolamine and the tetramethylammonium hydroxide. It was found surprisingly that the monoethanolamine and its mixtures with alcohols, water and aprotic solvents and the tetramethylammonium hydroxide and its mixtures with alcohols and aprotic solvents are particularly effective in decomposing and rapidly removing the polyimide phase. The decomposition and the removal of the polyimide component can be carried out at an ambient temperature or at elevated temperatures to facilitate the decomposition process and the removal of decomposition products. Preferably the polyimide decomposition process and the removal of the low molecular weight decomposition product are carried out concurrently in a common solvent media. In one embodiment of this invention, the polyimide decomposition and removal process is carried out at from about 50° C. to about 180° C., preferably from about 80° C. to 150° C. The time required to fully decompose polyimide and to remove products of the decomposition process from the article will depend on the shape and the thickness of the article and on process conditions, such as reagent concentration, agitation rate, temperature and the like, as will be recognized by those skilled in the art. The porous poly(aryl ether ketone) articles are then washed with an alcohol, water, or other suitable solvent, dried and incorporated into a device, such as membrane separation module.

In some embodiments, it is desirable to perform the final drying step from a low surface tension solvent, such a hydrocarbon, or a fluorocarbon. It is known in the art that drying a porous article from such low surface tension solvent can preserve the porous structure. Preferred hydrocarbons include pentane, hexane, cyclohexane, heptane, octane, and mixtures thereof. Preferred fluorocarbon solvents include chlorofluorocarbons, for example, Freon 113® chloroflurocarbon, and perfluorocarbons, for example, Fluorinert 75®. The porous articles can be dried in air or in an inert gas such as nitrogen. Drying may be also carried out under vacuum. The articles may be dried at temperatures at which drying takes place at a reasonable rate and which do not adversely affect the porous structure. The drying temperatures can be between about 0° C. and about 200° C., preferably between 40° C. and 100° C. The drying time can be as short as about 30 seconds in a continuous drying operation and as long as 24 hours or longer in an enclosed oven. The thus formed porous articles can also be optionally annealed at a temperature from about 150° C. to about 350°

C., preferably at a temperature from about 200° C. to about 300° C. to increase the crystallinity of the article and/or to improve high temperature stability. It has been discovered by us that extensive high temperature treatment of porous PAEK articles at these temperatures improves stability of the porous structure. Extensive heat treatment can result in PAEK cross-linking. In some embodiments, the annealing can be carried out by immersing the porous poly(aryl ether ketone) article into a liquid media, such as glycerin maintained at a desired elevated temperature. This annealing step can be carried out in lieu of or in addition to the annealing of the poly(aryl ether ketone)/polyimide blend article prior to leaching.

The porous PEEK articles formed from PEEK blends with poly(ether imide) are characterized by a narrow pore size distribution and frequently exhibit small average pore diameter. The average pore diameter can be below 100 nanometer, and frequently is below 20 nanometer. In some embodiments it is desirable to form porous PEEK articles with bimodal pore size distribution. Bimodal pore size distribution can be advantageous in some separation applications, such as affinity chromatography. PAEK articles with bimodal size distribution can be formed, for example, from blends of PAEK polymer with two or more polyimides.

The porous PAEK articles with small pore diameter (100 nanometer pore diameter and below) are further characterized by a high specific surface area. The specific surface area can be as high as 20 m$^2$/g or higher, preferably is 100 m$^2$/g or higher, and most preferably is 200 m$^2$/g or higher. Such porous articles can be particularly useful as sorbents and chromatographic media.

In some embodiments of this invention, it is desirable to draw the poly(aryl ether ketone) article to affect the shape and the size of pores and/or to improve mechanic properties. The membrane articles are drawn to improve permeability, separation efficiency or mechanical properties. The drawing can be performed on the poly(aryl ether ketone)/polyimide blend precursor prior to the removal of the polyimide phase or on the porous poly(aryl ether ketone) article after the polyimide phase has been decomposed and removed, or both. Furthermore, the drawing step can be carried out prior or after the drying step. In some embodiments, the porous structure can be impregnated with a liquid processing aid, such as glycerin, prior to drawing. The articles are drawn by stretching the films, the fiber, or the hollow fiber under tension. Conventional equipments, such as godets, can be utilized to draw the articles. The articles are drawn to a ratio of between 1.1 to about 10 or more. The draw ratio is defined as the ratio of the final length after drawing to the original length before drawing:

$$L_f/L_i,$$

where $L_f$ is the final length after drawing and $L_i$ is the initial length before drawing.

The preferred drawing temperature is dependent upon whether the article contains plasticizers or other processing aids at the time of drawing. For poly(aryl ether ketone)/polyimide blend precursor article, it can further depend on the molecular weight of the polyimide and its concentration, as will be recognized by those skilled in the art. For articles substantially free of plasticizer, the drawing temperature is above the glass transition temperature and frequently below the melting point of the poly(aryl ether ketone) polymer. The drawing temperature is preferably between 140° C. and 360° C., most preferably between 160° C. to about 330° C. For articles that contain plasticizers, the drawing temperature can be substantially lower and will depend on the nature and the concentration of the plasticizer as will be recognized by those skilled in the art.

The line speeds for conducting the drawing step may vary significantly. Preferred line speeds range from about 1 meter per minute to about 200 meters per minute, particularly preferred line speeds range from 5 meter per minute to 50 meter per minute.

The porous articles of this invention can be in the form of a flat sheet film, a fiber, a tube, a hollow fiber, or any other desirable shape. The porous articles of this invention can be used as an adsorption media, as a separator in a device, such as a battery separator, or as a fluid separation membrane. The membrane articles can be in the form of a flat sheet, in a tubular form, or a hollow fiber configuration. In the case of hollow fibers, the fiber preferably possess an outside diameter from about 50 to about 5,000 micrometers, more preferably from about 80 to about 1,000 micrometers, with a wall thickness from about 10 to about 1,000 micrometers, preferably from 20 to 500 micrometers. In the case of films, the film preferably possess a thickness of from about 10 to about 1,000 micrometers, most preferably from about 25 to about 500 micrometers. The films may be optionally supported by a permeable cloth or a screen.

It is also within the scope of present invention to form multilayer porous PAEK articles or PAEK articles with multiple zones that differ in pore size. The multi-zone porous articles that contain porous zones that differ by at least about 10% in the average pore size or by at least about 5% in the pore volume are known to impart certain advantages to mechanical or separation characteristics of the article. For example, the multi-zone porous membranes can provide improved mechanical properties particularly in fluid separation applications that require periodic back washing, are known to exhibit a lower cross membrane pressure drop, a decreased susceptibility to breach in membrane separation layer and in some applications a decreased propensity to fouling. The multi-zone porous articles are formed from two or more PAEK/porogen blends that differ in blend chemical composition. The blends can, for example, contain different PAEK and polyimide polymer porogen components. Preferably, the chemical composition of individual blends differs in the PAEK/polyimide ratio. The PAEK polymers content of the first blend can differ from the PAEK polymer content of the second and any additional blend by at least 1 weight percent, preferably by at lease 5 weight percent, more preferably by at least 10 weight percent.

The multilayer flat sheet PAEK articles or multilayer PAEK articles of the tubular configuration can contain two, three or more contiguous layers that differ in the average pore size and/or pore volume. Furthermore, the individual layer can vary from about 1% of the overall article thickness or less to about 99% of the article thickness or more, typically from 10% to 90% of the article thickness. The layer comprised of the smaller average size pores can be about 1 micrometer thick or less to about 100 micrometers thick or more and is supported by or sandwiched between layers with a substantially larger average pore size.

The preferred method of PAEK article functionalization is by reacting the preformed PAEK article with a primary amine via formation of ketimine linkages as illustrated below:

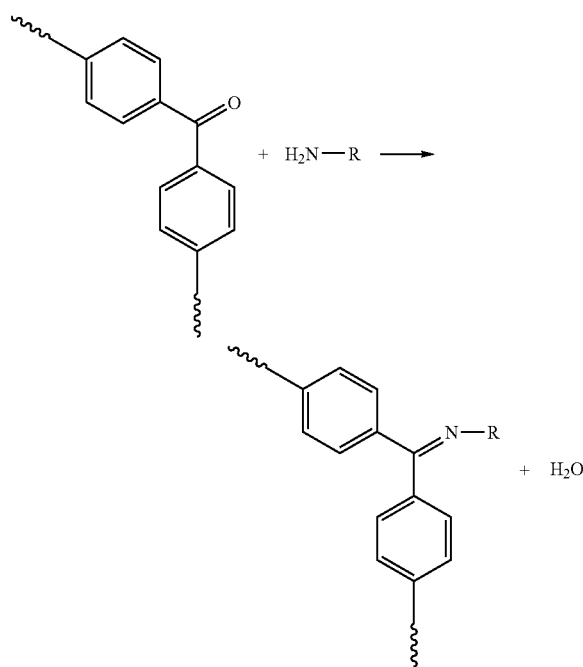

wherein R is a substituted hydrazine radical, —NH—R', or an aliphatic hydrocarbon radical, a perfluoro hydrocarbon radical, a siloxane radical, or an organic radical that contains one or multiple target functional groups, such as ~OH, ~COOH, ~SO$_3$H, ~NH$_4$, ~NH$_2$, and ≈NH. An example of functional hydroxyl group containing radical is ~CH$_2$CH$_2$OH, ~CH$_2$CH$_2$CH$_2$OH, and ~CH$_2$CHCH$_3$CH$_2$OH. An example of functional carboxyl group containing radical is ~CH$_2$CH$_2$COOH, ~CH$_2$CH$_2$CH$_2$COOH, and ~CH$_2$CHCH$_3$CH$_2$OOOH. The term "functionalized article" as referred herein is defined as the modification of the preformed porous PAEK article with chemical groups that impart target functional properties and the process of attaching such groups is defined as "functionalization". The preformed porous PAEK article is preferably functionalized by reacting it with a primary aliphatic amine or a substituted hydrazine. To affect optimal surface modification the reaction is preferably carried out in anhydrous conditions at a temperature between 50° C. to 200° C., preferably between 80° C. to 150° C., most preferably between 100° C. and 120° C. Examples of suitable primary amines include hydroxylamine, monoethanolamine, monopropanolamine, monobutanolamine, ethylenediamine, propylenediamine, or butylenediamine, poly(ethylene imine), 4-aminobutyric acid, 6-aminocaproic acid, 8-aminocaprylic acid, 3-amino-1-propanesulfonic acid. The functionalization can be carried out utilizing a neat primary amine or its solution in a solvent. Suitable solvents include alcohols, aprotic solvents and high boiling hydrocarbons.

If the porous PAEK article is formed by the RPR process utilizing a primary amine, the reaction can be carried out under conditions that affect both the formation of the porous PAEK article and the modification of the porous PAEK article via ketimine group formation in a single step process. It was found that carrying out the RPR process at elevated temperatures, preferably above 80° C., most preferably from about 100° C. to about 120° C., in an anhydrous reaction media while utilizing a high concentration of amine reagent, leads to the formation of a porous and functionally modified PAEK article in a single step. In one such example, ≈C═N—CH$_2$CH$_2$OH group modified porous PEEK article is formed in a single step RPR process from PEEK/PEI blend by reacting the precursor blend article with neat monoethanolamine at about 100° C.

In some embodiments, it is desirable to form unmodified porous PAEK articles by the RPR process from PAEK/PI blends. The unmodified PAEK article can be than utilized as is or further functionalized by reacting with a target primary amine. To form an unmodified porous PAEK article by the RPR process the precursor PAEK/PI blend article is contacted with the primary amine under conditions that suppress ketimine group formation, i.e. at moderate temperatures and in a relatively dilute amine solution that preferably further contains water. It will be recognized by those skilled in the art that by selecting balanced reaction conditions the PAEK modification via formation of imine linkages can be largely suppressed while an adequately high rate of PI phase decomposition is still maintained. For example, the RPR process can be carried out utilizing monoethanolamine/dimethylformamide/water mixture 20/70/10 by volume at 80° C. that provides for a high rate of porous PAEK article formation while suppressing functionalization via the imine group formation. The preferred reaction temperature is from about 70° C. to about 100° C. The unmodified porous PEAK articles can be also prepared by removing ketimine, ≈C═N~R, functional group from the functionalized PEAK article by hydrolyses. The ketone groups can be quantitatively reformed by hydrolyzing ketimine groups, for example, with hydrochloric acid at an elevated pressure as described by B. E. Lidfors et al., in Macromolecular Chemistry Rapid Communications, Vol. 12, pages 337-345, 1991. The unmodified porous PAEK articles are particularly useful as fluid separation membranes that can operate in aggressive solvent environments such as nanofiltration membranes for separation of solvent based mixtures.

The unmodified porous PAEK articles prepared as described above can be modified by primary amine reagents to impart target functionality. The modification can be performed throughout the porous structure or carried out selectively at the surface of the porous article only. The application requirements determine the mode of the modification and the functionality of the modifying agent.

The functionalization process of this invention further provides for preparation of composite membranes with an ultra-thin graft separation layer. The process can be carried out under a condition that localizes the modification to the surface region only. For example, composite membranes can be formed utilizing preformed porous PAEK substrate by carrying out the functionalization process under conditions that prevent occlusion of the reactant graft molecules into the porous substrate. The occlusion can be limited by utilizing reactants with a molecular weight which is higher than the molecular weight cut-off of the porous substrate. Composite membranes with an ultra-thin polymeric layer can thus be formed. Alternatively the graft composite membrane with an ultra-thin polymeric layer can be formed by first depositing a thin graft separation layer on top of a dense substrate prepared from PEEK/PEI blend and then removing the PEI phase in a subsequent step by selectively decomposing and removing PEI polymer to form the porous sub-layer structure. The grafting on top of the dense substrate prevents the occlusion of the graft layer material into the porous structure and facilitates the formation of the ultra-thin separation layer. The following three-step process is thus typically utilized to prepare the graft composite membrane. First a precursor of a desired shape, such as hollow fiber, is formed form the PEEK/PEI polymer blend by melt processing. In the second step, a graft polymer separation layer is formed on top of the precursor by reacting the precursor with an amino-functional reagent, preferably amino-functional oligomer or polymer. In the third step, the PEI component is removed by decomposing the PEI polymer into low molecular weight, highly soluble fragments by contacting the precursor with aliphatic amine, such as monoethanolamine, thus forming the porous structure underneath the separation layer. This novel membrane formation process is a modification of the Reactive Porogen Removal (RPR) process described above. Since the porous structure is developed after the separation layer is formed the occlusion of the substrate by the graft molecules is prevented and an ultra-thin separation layer of graft polymer is formed. The composite membranes can be in a flat sheet or in a hollow fiber configuration with graft separation layer deposited on one or both surfaces. Advantageously composite membranes are prepared by reacting PAEK/PEI precursor blend or the porous PAEK membrane with an amino-functional oligomer or polymer to form the composite membrane. The modification is via Schiff base reaction between amino groups in the amino-functional reagent and the ketone groups in the PAEK. The composite membrane can be, for example, a fluid separation membrane, such as nanofiltration, ultrafiltration, microfiltration or gas separation membrane, or a contactor membrane. The chemical composition and the molecular weight of the graft molecule are determined by the application requirements. The surface chemistry and pore size of ultrafiltration and nanofiltration PAEK membranes can be modified by grafting to impart target separation properties.

It will be recognized by those skilled in the art that separation layer material selection affects membrane separation characteristics by altering interactions between the separation layer and the solvent/solute. According to the Flory-Huggins solution theory, the equilibrium volume fraction of the penetrant in the separation layer, $\phi_{pen.}$, can be related to the activity of the penetrant, $a_{pen.}$, by the following expression:

$$\ln a_{pen.} = \ln \phi_{pen.} + (1 - \phi_{pen.})\left(1 - \frac{v_{pen.}}{v_{polymer}}\right) + \chi(1 - \phi_{pen.})^2 \quad (1)$$

wherein $\chi$ is the separation layer polymer-penetrant interaction parameter The interaction parameter is expected to obey the following relation:

$$\chi = \chi_S + \chi_H = \chi_S + \left[\frac{v_{pen.}(\delta_{pen.} - \delta_{polymer})^2}{RT}\right] \quad (2)$$

wherein $\chi_S$, $\chi_H$ are the entropic and the enthalpic contributions to $\chi$, respectively and $\delta_{pen.}$, $\delta_{polymer}$ are the solubility parameters of penetrant and the separation layer polymer, respectively The $\chi$ parameter gives a qualitative estimation of the interactions between the polymer and the penetrant. The higher the $\chi$ parameter, the lower the interaction between the polymer and the penetrant. It is clear from the Equation 2 that the closer the solubility parameters, $\delta_{pen.}$ and $\delta_{polymer}$, are the higher is the interaction between the solvent and the polymer.

The nanofiltration and ultrafiltration membrane separation efficiency (high solvent flux coupled with high rejection of the solutes) can be maximized by building in interactions between the solvent and the separation layer material.

The surface modification and pore size adjustment can be conveniently carried out by grafting since the substrate is totally solvent resistant. Surface graft layer chemistry can be tailored towards separation of hydrophilic compounds from aqueous and polar organic solvent system wherein the fouling is minimized. Separation layer material selection and the molecular weight of the graft molecule can affect separation characteristics of the composite membrane such as the molecular weight cut off and in particular the extent of membrane fouling by altering interactions between the separation layer and the solvent/solute. Highly hydrophilic membrane surfaces with nearly neutral charge, as exemplified by polyethylene oxide, are known to be highly fouling resistant. It is known that poly(ethylene oxide), PEO, and poly(ethylene glycol), PEG, surfaces impart exceptional biocompatibility, limit cell attachment and protein adsorption. By employing amino-functional polyethylene oxide oligomers and polymers of different molecular weight, the separation characteristics of the PAEK membrane can be optimized while minimizing membrane fouling by rejected solutes. Composite filtration membranes for solvent based separations can be formed, for example, by reacting porous PAEK membranes with amino-functional siloxane, amino-functional polyethylene oxide or polyethylene imine. The separation characteristics of these graft membranes, such as molecular weight cut off is tailored by employing amino-functional oligomers and polymers of different molecular weight. Cross-linked siloxane based composite membranes are frequently considered as membranes of choice for organic solvent systems, since siloxane polymers exhibit solubility parameters similar to that of most organic solvents of interest, especially non-polar solvents. The use of cross-linked silicones, such as polydimethyl siloxane, as a membrane for separation of organic solvents is disclosed in U.S. Pat. Nos. 5,265,734 and 5,205,934. However, the separation layer of these membranes is prone to delamination and the long term durability and chemical stability of these membranes in aggressive solvent media is a concern. The separation layer of composite siloxane based membranes of this invention is chemically grafted to the PAEK substrate and thus does not delaminate and exhibits superior durability in aggressive organic solvent systems. The dimethylsiloxane groups modified porous PAEK membranes exhibit low surface energy and are thus essentially hydrophobic. These properties make such membranes most useful for the preparation of porous membranes for gas-liquid transfer devices in water based systems, i.e. membrane contactors. The porous PAEK membranes with pore diameter from about 100 nanometer and below when modified with siloxane groups exhibit high bubble point and are thus particularly useful as membrane contactors. The porous PEEK membranes obtained from PEEK/PEI blends by the RPR process exhibit uniform pore size distribution with pore size in the range of 10 to 30 nm and thus are particularly suited for the preparation of siloxane group modified PEEK contactor membranes.

In another embodiment of this invention the surface of the functionally modified PAEK articles can be sequentially further modified by reacting with molecules containing one or more functional groups. The target groups provide additional desired functionality and can be utilized, for example, to bind biological molecules such as proteins. Examples of an additional functional group include an epoxide group, an isocyanate group, a silane group or a triazine chloride. A well know isocyanate or trichloro triazine coupling chemistry can be advantageously utilized to conduct the sequential functionalization:
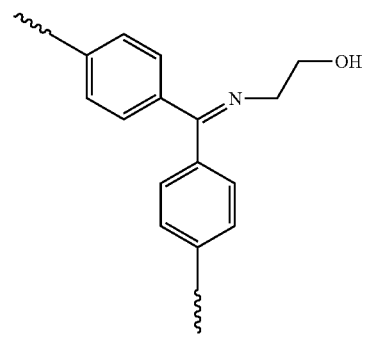
(I)
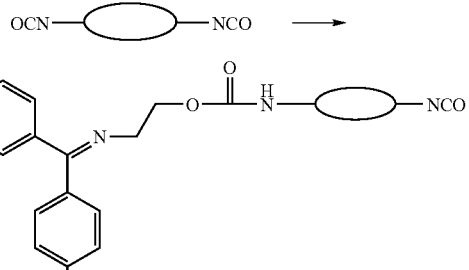
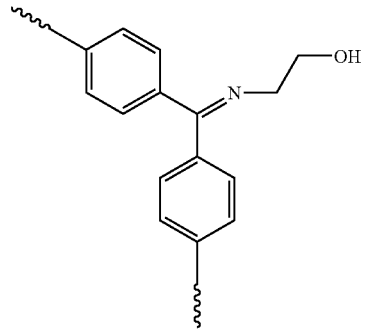
(II)
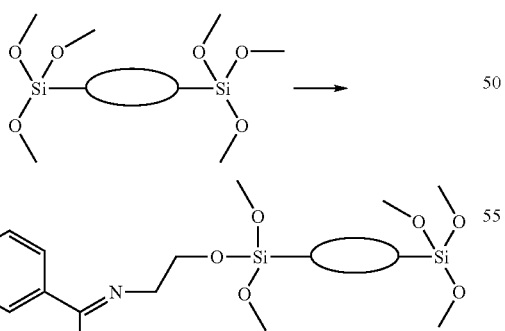
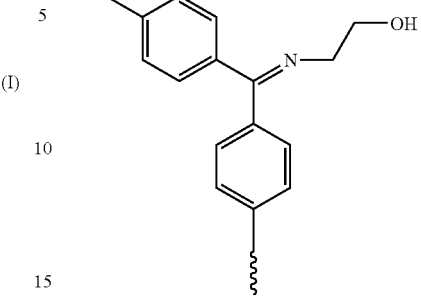
(III)
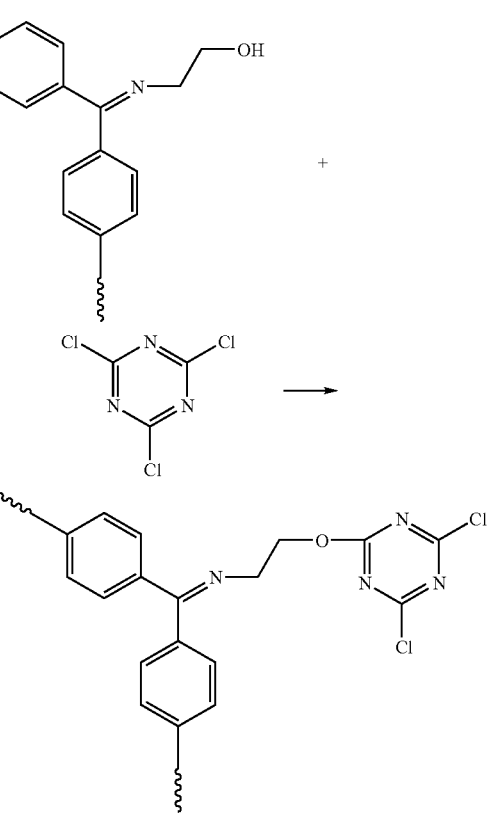
(IV)
The thus functionalized porous articles can be used as substrates for preparation of affinity separation membranes or chromatographic media.

It is well known in the art that polymers containing perfluorocarbon groups are suited for and are more durable in aggressive solvents and/or chemical environments. PAEK porous membranes modified with perfluorocarbon groups thus exhibit enhanced durability and chemical stability. Porous PAEK membranes modified with the perfluorohydrocarbon groups exhibit very low surface energy and are thus essentially oleophobic. These properties make such membranes most useful for the preparation of porous membranes for gas-liquid transfer devices, i.e. membrane contactors. The porous PAEK membranes with pore diameter from about 100 nanometer and below when modified with perfluorohydrocarbon groups exhibit exceptionally high babble point and are thus particularly useful as membrane contactors. The porous PEEK membranes obtained from PEEK/PEI blends by the RPR process exhibit uniform pore size distribution with pore size in the range of 10 to 30 nm and thus are particularly suited for the preparation of contactor membranes. The perfluorocarbon group modified PAEK membranes can be prepared by modifying porous PAEK article with an amino-functional perfluorohydrocarbon or by a two step process wherein the porous PAEK article is first functionalized and the functional groups are then reacted with reactive groups in a functional perfluorohydrocarbon. For example, $\approx C=N-CH_2CH_2OH$ group modified porous PEEK article can be reacted with a perfluorohydrocarbon containing an epoxide group, an isocyanate group or a silane group. Examples of perfluorohydrocarbons containing reactive functional groups include FluoroPel PFC 601AFA (containing silane reactive groups) and PFC 504A/coE5 (containing epoxide reactive groups), both commercially available from Cytonix Corporation.

The functionalized porous poly(aryl ether ketone) membranes of this invention can be advantageously utilized in numerous fluid separation applications, such as microfiltration, ultrafiltration, nano-filtration and gas separations, as affinity separation membranes or as membrane contactors. The fluid separation method typically involves contacting a feed fluid with the poly(aryl ether ketone) membrane of this invention under conditions that sustain a pressure differential across the PAEK membrane (or a partial pressure differential in the case of gas components). At least a fraction of the feed mixture is allowed to permeate through the PAEK membrane. In the process of permeation the permeate fraction of the feed mixture is depleted in a component and the non-permeate fraction of the feed mixture is enriched in this component. The component or components can be in the form of a solute dissolved in the feed fluid, a solid matter suspended in the feed fluid, or a gaseous component being a part of the feed mixture. Furthermore, the fluid separation method can be a counter-current flow process, tangential flow filtration process, a cross flow filtration process or a dead-end filtration process.

The present invention is described below by examples, which should not be construed as limiting the present invention.

ANALYTICAL EXAMPLE 1

A sample of annealed PEEK film, 1 g, (film thickness 110 μm) was placed into 100 ml of neat monoethanolamine kept at 120° C. After 4 hours the PEEK film was retrieved from the solution, washed sequentially with water and isopropyl alcohol, and dried at 50° C. under vacuum overnight. The functionalized PEEK film exhibited an advancing water contact angle of 81° and a receding water contact angle of 0°. In comparison, the precursor PEEK film exhibited an advancing water contact angle of 89° and a receding contact angle of 64°. The result demonstrates that functionalization with monoethanolamine leads to improved wettability.

ANALYTICAL EXAMPLE 2

A sample of annealed PEEK film, 1 g, (film thickness 110 μm) was placed into 100 ml of neat amine-terminated silicone fluid, GP4, manufactured by Genesee Polymers Corporation, which was kept at 120° C. After 4 hours the PEEK film was retrieved from the solution, extensively washed with ethanol and dried at 80° C. under vacuum overnight. The GP4 silicone functionalized film exhibited an advancing water contact angle of 110° and a receding contact angle of 71°. In comparison, the precursor untreated PEEK film exhibited an advancing water contact angle of 89° and a receding contact angle of 64°. The result demonstrates that functionalization with siloxane increases surface hydrophobicity.

ANALYTICAL EXAMPLE 3

A sample of annealed PEEK film, 1 g, (film thickness 110 μm) was placed into 100 ml of neat amine-terminated silicone fluid, GP6, manufactured by Genesee Polymers Corporation, which was kept at 120° C. After 4 hour treatment, the PEEK film was retrieved from the solution, extensively washed with ethanol and dried at 80° C. under vacuum overnight. The thus functionalized film exhibited an advancing water contact angle of 107° and a receding contact angle of 73°, In comparison, the precursor untreated PEEK film exhibited an advancing water contact angle of 89° and a receding contact angle of 64°. The result demonstrates that functionalization with siloxane increases surface hydrophobicity.

PREPARATIVE EXAMPLE 4

The example demonstrates preparation of functionalized porous PEEK article in a single step RPR process.

A film was prepared by compression molding pellets of pre-blended PEEK/PEI (50:50, by weight) at 370° C. The film was solidified by quenching in water. The PEEK/PEI pellets were prepared by blending PEEK polymer (G450 from Victrex Corp.) and the PEI polymer (Ultem™ 1000 from GE Corp.) in a twin screw extruder. The thus formed film was annealed at 250° C. for 1 hour to affect crystallization of PEEK polymer. The annealed film was then placed into neat monoethanolamine solution kept under nitrogen at 120° C. After 4 hours, the thus formed porous PEEK film was washed with IPA and further washed with methanol in a Soxlet apparatus overnight. The porous film was then dried at 80° C. under vacuum overnight. The film did not contain any detectable residual polyimide as determined by FT-IR analyses. The film contained 1.26% nitrogen as determined by the elemental microanalyses. The bound nitrogen is attributed to imine linkages formed as the result of monoethanolamine reaction with ketone groups in the PEEK polymer backbone.

PREPARATIVE EXAMPLE 5

This example demonstrates preparation of porous PEEK article by the RPR process without affecting porous article modification.

A film was prepared by compression molding pellets of pre-blended PEEK/PEI (50:50, by weight) at 370° C. The film was solidified by quenching in water. The PEEK/PEI pellets were prepared by blending PEEK polymer (G450 from Victrex Corp.) and the PEI polymer (Ultem™ 1000 from GE Corp.) in a twin screw extruder. The thus formed film was annealed at 250° C. for 1 hour to affect crystallization of PEEK polymer. The annealed film was then placed in solution containing dimethylformamide/monoethanolamine/water mixture 90/5/5 by volume. The film was maintained in the solution at 100° C. under nitrogen atmosphere for 4 hours. The thus formed porous PEEK film was washed with IPA and further washed with methanol in a Soxlet apparatus overnight. The porous film was then dried at 80° C. under vacuum overnight. The film did not contain any detectable residual polyimide as determined by FT-IR analyses. The film contained 0.09% nitrogen as determined by the elemental microanalyses. The thus prepared porous PEEK film was essentially free from modification.

PREPARATIVE EXAMPLE 6

The example demonstrates preparation of nanofiltration membrane by surface grafting.

The precursor PEEK/PEI blend film was prepared by compression molding following the procedure described in example 5 obtained by compression molding of a pre-blended PEEK/PEI (50:50, by weight) pellet at ca. 370° C. followed by quenching in water, was heat treated at 250° C. for 1 hour to effect the crystallization of PEEK polymer. The annealed film was then placed in solution of amino-functional silicone fluid, GP4, set at 100° C. for 4 hours. The film was then extensively washed with ethanol and placed in a solution containing dimethylformamide/monoethanolamine/water mixture 90/5/5 by volume. The film was maintained in the solution at 100° C. under nitrogen atmosphere for 4 hours. The thus formed porous PEEK membrane was washed with IPA and further washed with methanol in a Soxlet apparatus overnight. The membrane was then dried at 80° C. under vacuum overnight. The separation characteristics of thus prepared membrane were tested utilizing dye solutions in water. The tests were performed in stirred test cells at 30 psig feed pressure utilizing 0.5% dye solutions. The membrane exhibited 100% rejection of dyes with molecular weight of 400 Dalton and higher that is representative of nanofiltration membrane. When subjected to analogous dye filtration tests, the molecular weight cut off of porous PEEK membrane prepared as described in Example 5, wherein the membrane did not undergo surface grafting, was 800 Dalton.

PREPARATIVE EXAMPLE 7

The example demonstrates preparation of composite gas separation membrane by surface grafting.

The precursor PEEK/PEI blend film was prepared by compression molding following the procedure described in example 5. The thus prepared film was then placed in neat amine-terminated silicone fluid, GP6, manufactured by Genesee Polymers, maintained at 100° C. for 4 hours wherein only one film surface was in contact with the fluid. The film was then washed with ethanol and placed in solution containing dimethylformamide/monoethanolamine/water mixture 90/5/5 by volume. The film was maintained in the solution at 100° C. under nitrogen atmosphere for 4 hours. The thus formed composite PEEK membrane was washed with IPA and further washed with methanol in a Soxlet apparatus overnight. The membrane was then dried at 80° C. under vacuum overnight. The gas permeation characteristics of the membranes were measured at room temperature and are summarized in Table 1. The gas permeation/separation characteristics of the composite membrane are listed in Table 1. The properties are compared to that of the porous PEEK membrane of Example 5 that did not undergo surface grafting. The gas permeance is reported in GPU units (1 GPU=1×10$^{-6}$ cm$^3$ (STP)/cm$^2$·s·cmHg ). The porous membrane does not possess oxygen/nitrogen gas separation properties. The composite membrane exhibited an ideal oxygen/nitrogen gas separation factor of 1.5 as the result of the formation of graft silicone gas separation layer on top of the porous PEEK support.

TABLE 1

Gas transport properties of PEEK membranes

| PEEK Membrane | Permeance (GPU) | | | Separation factor |
| --- | --- | --- | --- | --- |
| | $O_2$ | $N_2$ | He | $O_2/N_2$ |
| Example 5 | 3000 | 3200 | 8400 | 0.94 |
| Example 7 | 330 | 220 | 440 | 1.5 |

Although the invention has been described with reference to a particular arrangement of parts, features and the like, these are not intended to exhaust all possible arrangements or features, and indeed many other modifications and variations will be ascertainable to those of skill in the art.

What is claimed is:

1. A process for the preparation of a porous poly(aryl ether ketone) article comprising the steps of:
    (a) forming a blend of poly(aryl ether ketone) polymer with a polyimide,
    (b) forming a shaped article from said blend by extrusion, casting or molding,
    (c) annealing said shaped article,
    (d) bringing said shaped article into contact with a primary amine to affect decomposition of the polyimide phase in said shaped article into low molecular weight fragments without affecting functionalization of the poly(aryl ether ketone) phase with said primary amine,
    (e) removing said low molecular weight fragments from said article,
    (f) washing said porous poly(aryl ether ketone) article, and
    (g) drying said porous poly(aryl ether ketone) article.

2. The process of claim 1 wherein in step (d) said shaped article is brought in contact with a solution of said primary amine in a solvent.

3. The process of claim 2 wherein said solution contains water.

4. The process of claim 3 wherein said step (d) is carried out at a temperature between about 70° C. and about 150° C.

5. The process of claim 1 wherein said porous poly(aryl ether ketone) article is functionalized by reacting with a substituted hydrazine or a primary aliphatic amine.

6. The process of claim 5 wherein said substituted hydrazine or said primary aliphatic amine contain one or more functional groups.

7. The process of claim 5 wherein said reaction with said primary aliphatic amine is carried out at the exterior surface of said porous article only.

8. The process of claim 7 wherein said primary aliphatic amine comprises a polymer or an oligomer.

9. The process of claim 8 wherein said polymer or said oligomer comprises an amino-functional siloxane, an amino-functional perfluoro hydrocarbon, a poly(ethylene imine) or an amino-functional poly(ethylene oxide).

10. The process of claim 9 wherein said article comprises a fluid separation membrane, a membrane contactor or a membrane separator.

11. The process of claim 6 wherein said primary aliphatic amine comprises hydroxylamine, monoethanolamine, monopropanolamine, monobutanolamine, ethylenediamine, propylenediamine, butylenediamine, poly(ethylene imine), 4-aminobutyric acid, 6-aminocaproic acid, 8-aminocaprylic acid or 3-amino-1-propanesulfonic acid.

12. The process of claim 1 wherein said poly(aryl ether ketone) comprises poly(ether ether ketone) or poly(ether ketone).

13. The process of claim 12 wherein said polyimide comprises a poly(ether imide) or its copolymer that contains the following repeat unit:

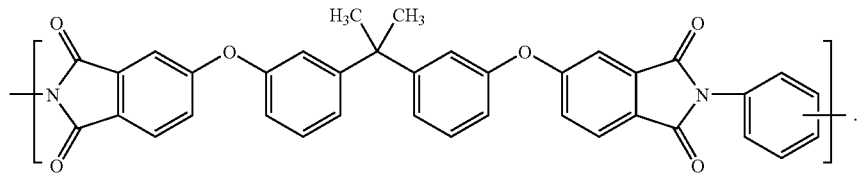

14. The process of claim 13 wherein said poly(ether imide) copolymer contains dimethylsiloxane or sulfone units.

15. The process of claim 13 wherein said poly(ether ether ketone) comprises from about 40 to about 60 weight percent of said blend.

16. The process of claim 1 wherein said annealing step is carried out at temperature between about 170° C. and about 330° C.

17. The process of claim 6 wherein said functional group comprises a polar group, a negatively or a positively charged ionic group, a hydrophobic group or a non-polar group.

18. The process of claim 1 wherein said porous article comprises a flat sheet, a sphere, a rod, a fiber, a tube, or a hollow fiber.

19. The process of claim 18 wherein said flat sheet and said hollow fiber comprises a fluid separation membrane.

20. The process of claim 1 wherein said poly(aryl ether ketone) article comprises a multilayer article formed from two or more poly(aryl ether ketone) polymer polyimide blends that differ in blend chemical composition.

21. The process of claim 20 wherein the poly(aryl ether ketone) polymer weight content in said blends differs by at least about 1 percent.

22. The process of claim 1 wherein said blend of poly(aryl ether ketone) with polyimide contains an additional polymeric porogen or an additive.

23. The process of claim 5 wherein said article comprises a fluid separation membrane or an affinity separation membrane.

24. The process of claim 19 wherein said fluid separation membrane comprises a nanofiltration or an ultrafiltration membrane for the separation of solutes from a solvent based mixture.

25. The process of claim 1 wherein said polyimide comprises a mixture of at least two polyimides.

26. A process for the preparation of a functionalized porous poly(aryl ether ketone) article comprising the steps of:
 (a) forming a blend of poly(aryl ether ketone) polymer with a polymeric porogen,
 (b) forming a shaped article from said blend by extrusion, casting or molding,
 (c) annealing said shaped article,
 (d) bringing said shaped article into contact with a liquid media that contains a primary amine to affect removal of said polymeric porogen from shaped article while simultaneously affecting functionalization of the poly (aryl ether ketone) phase with said primary amine.

27. The process of claim 26 wherein said poly(aryl ether ketone) comprises poly(ether ether ketone) and said polymeric porogen comprises polyimide.

28. The process of claim 27 wherein said polyimide comprises a poly(ether imide) or poly(ether imide) copolymer that contains the following repeat unit:

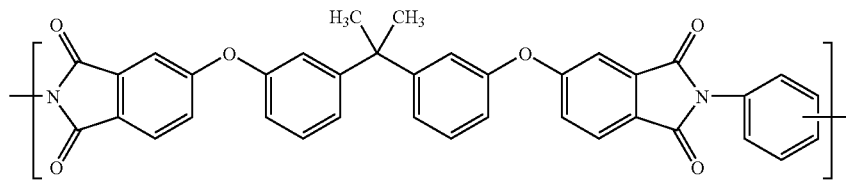

29. The process of claim 26 wherein said primary amine comprises a substituted hydrazine or an aliphatic amine.

30. The process of claim 29 wherein said primary aliphatic amine comprises hydroxylamine, monoethanolamine, monopropanolamine, monobutanolamine, ethylenediamine, propylenediamine, or butylenediamine.

31. The process of claim 28 wherein said poly(ether imide) copolymer contains dimethylsiloxane or sulfone units.

32. The process of claim 27 wherein said poly(ether ether ketone) comprises from about 40 to about 60 weight percent of said blend.

33. The process of claim 27 wherein said porous article is semi-crystalline.

34. The process of claim 27 wherein said porous article comprises a flat sheet, a sphere, a rod, a fiber, a tube, or a hollow fiber.

35. The process of claim 34 wherein said flat sheet, said tube, or said hollow fiber comprises a fluid separation membrane.

36. The process of claim 27 wherein said poly(aryl ether ketone) article comprises a multilayer article formed from two or more poly(aryl ether ketone) polymer polyimide blends that differ in blend chemical composition.

37. The process of claim 27 wherein said blend of poly(aryl ether ketone) with polyimide contains an additional polymeric porogen or an additive.

38. The process of claim 27 wherein said polyimide comprises a mixture of at least two poly(ether imides).

* * * * *